Aug. 26, 1958

S. M. LINZELL ET AL 2,849,246

CLOSURE DEVICE

Filed June 4, 1945

Witnesses:
Herbert E. Metcalf
Nelson C. Cuddeback

Inventors:
Stanley M. Linzell
Dan J. Dorcy
By: Robert A. Saunders
Attorney.

Aug. 26, 1958  S. M. LINZELL ET AL  2,849,246
CLOSURE DEVICE
Filed June 4, 1945  3 Sheets-Sheet 2

Witnesses:
Hubert E. Metcalf
Nelson C. Cuddeback

Inventors:
Stanley M. Linzell
Dan J. Dorcy
By:
Robert A. Lavender
Attorney

United States Patent Office 2,849,246
Patented Aug. 26, 1958

2,849,246

CLOSURE DEVICE

Stanley M. Linzell and Dan J. Dorcy, Chicago, Ill., assignors to the United States of America as represented by the United States Atomic Energy Commission Application June 4, 1945, Serial No. 597,476

3 Claims. (Cl. 286—20)

The present invention relates generally to sealing devices, and more particularly, to a quick opening and closing stuffing box suitable for rods, shafts, and the like, which finds application as a closure for the end of a coolant tube of a neutronic reactor.

In the operation of a neutronic reactor, it is necessary to load and unload a neutron fissionable isotope, such as $U^{233}$, $U^{235}$, $94^{239}$ or mixtures thereof, the bodies of fissionable material being in the form of sheathed slugs and/or elongated sheathed rods, into and from the coolant tubes mounted within the moderator of the reactor. In cooling the neutronic reactor, the heat of the neutronic reaction is abstracted by flowing a coolant fluid through the coolant tubes of the reactor in heat transfer relationship with respect to the sheathed bodies of fissionable material. In the loading and unloading of the coolant tubes of the neutronic reactor, particularly since the advent of elongated sheathed rods of fissionable material substantially the length of the reactor as compared to prior use of short slugs of from 6 inches to 2 feet in length, it is necessary to provide a suitable closure for the ends of the coolant tubes so that the closure at each end of a coolant tube may be rapidly opened and closed as the elongated rod is moved through the reactor and a new rod is inserted with the coolant still flowing through the coolant tube through at a reduced rate, and to prevent leakage of the coolant from the coolant tube. Furthermore, because of the harmful radiations emanating from the ends of the coolant tubes of a neutronic reactor from the neutronic reaction, it is necessary to load and unload a coolant tube of a reactor as rapidly as possible to prevent the harmful radiations from affecting the operating personnel. Neutronic reactors with which this invention finds application are disclosed and claimed in Fermi et al. Patent 2,708,656, dated May 17, 1955.

The present invention is concerned with overcoming the above difficulties and has for a principal object the provision of an improved quick opening stuffing box particularly suitable as a closure for a coolant tube of a neutronic reactor, although adapted for sealing other members.

As will hereinafter appear, the object of the invention is accomplished by providing a novel stuffing box and/or closure including two banks of packing to form a seal between the periphery of an elongated rod comprising bodies of fissionable material and the end of a coolant tube through which a coolant fluid is flowing to close and seal the end of the coolant tube to which it is applied. Clamping shoes in sets of three to which the packing is applied are placed in two banks so that the joints are staggered. An operating ring having a handle or wrench attached is placed concentric to and between the two banks of clamping shoes. Pins from the shoes fit into slots in this ring and the slots are so arranged that when the operating ring is rotated in one direction the shoes are thrust inwardly and when rotated in the other direction the shoes are thrust outwardly causing the packing to provide a seal against the elongated rod in the first case and to open to provide for axial movement of the elongated rod through the coolant tube in the second case. The housing of the stuffing box and/or closure is affixed to the coolant tube which receives the elongated sheathed rod of fissionable material; and a cooling fluid is circulated between the coolant tube and the elongated rod, the closure serving to provide a seal to prevent leakage of the coolant fluid from between the periphery of the rod and the end of the coolant tube.

Other objects and advantages of the present invention will be more readily understood from the following description read by reference to the attached drawings, wherein like reference characters indicate the same or similar parts:

Figure 1:
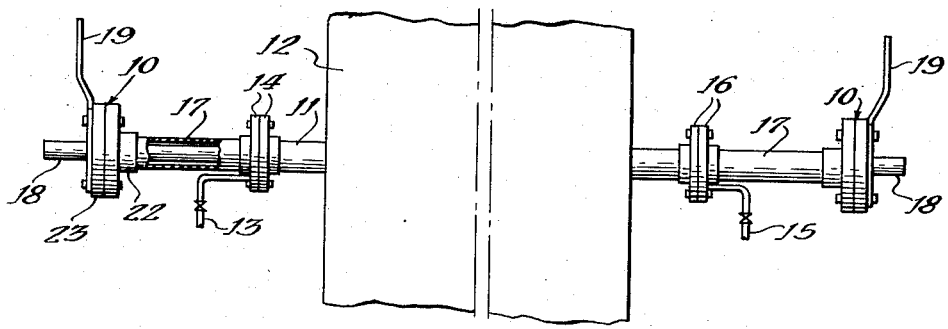
Figure 1 is a diagrammatic view in elevation illustrating a neutronic reactor with a coolant tube having the ends thereof closed by a novel quick operating closure constructed in accordance with the teachings of this invention.

Referring to Figure 1, it is preferred to describe the quick opening closure device and/or stuffing box 10 in combination with a coolant tube construction 11 of a neutronic reactor 12. For a particular form of neutronic reactor with which this invention is applicable, reference is made to the above-mentioned Fermi et al. patent.

Figure 2:
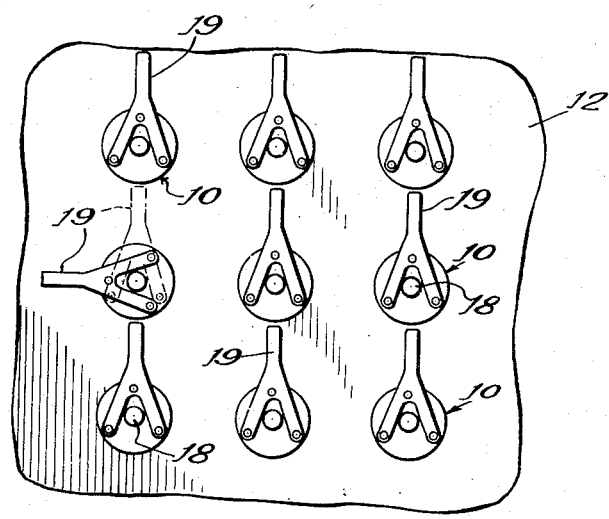
Figure 2 is a diagrammatic fragmentary elevational view of a neutronic reactor and a group of coolant tubes, a closure device constructed according to this invention shown applied to the end of each tube, illustrating the end closures in open, closed and intermediate positions.

The neutronic reactor with which this invention is described comprises broadly a moderator through which is dispersed a plurality of passages in which are positioned the coolant tube constructions 11, the number of coolant tubes depending on the size of the reactor and other factors. The tubes are placed in a predetermined geometrical pattern, such as is illustrated in Figure 2, with the centers of the coolant tubes spaced substantially 8 inches on centers in the lattice arrangement illustrated. Coated rods of fissionable material are disposed in the tubes. The neutronic reactor has biological shielding (not shown) arranged outside of and around the moderator through which the coolant tubes also pass. Coolant is supplied to the coolant tubes to dissipate the heat of the neutronic reaction within the bodies of fissionable material positioned within the coolant tubes. Dummy slugs such as aluminum-coated lead slugs and the like are placed within the ends of the coolant tubes extending within the biological shield at each end of the reactor and in the portion of the coolant tubes extending outside of the reactor to shield the operating personnel from the harmful emanations which may be projected through the coolant tubes.

Because of the effects of the harmful emanations, it is necessary to rapidly unload and load a coolant tube with fissionable material. The elongated rod with which it is desired to describe this invention, preferably is a sheathed rod a number of feet in length comprising bodies of fissionable material in the central portion which are to be within the moderator of the reactor, the ends of the sheathed rod which extend outside of the reactor and within the biological shielding being filled with lead and/or other material which will absorb the beta and gamma rays caused by the neutronic reaction. Since coolant is supplied to the coolant tube 11 under pressure, it is necessary that the closure device shall suitably seal the ends of the elongated rod extending from the ends of the coolant tube against leakage of the coolant fluid, which the present invention accomplishes. Because of the closeness of the spacing of the coolant tubes and the limitation of space at the loading and unloading ends of the reactor, it is necessary that the closure device shall be as small as possible and yet operate efficiently and serve to indicate whether the closure device is opened or closed.

In Figure 1, coolant is supplied to the coolant tube 11 through valve controlled inlet piping 13 and through passages in the flanges 14 affixed to the ends of the coolant tube on the inlet side of the reactor, the coolant after passage through the tube being discharged through the valve controlled outlet piping 15 connected to the flanges 16 affixed to the ends of the coolant tube on the outlet side of the reactor. Coolant tube extensions 17 are coupled to the flanges 14 and 16, respectively, to which the quick acting closure devices 10 are affixed by welding, or otherwise, to secure a water-tight joint.

Figure 3:
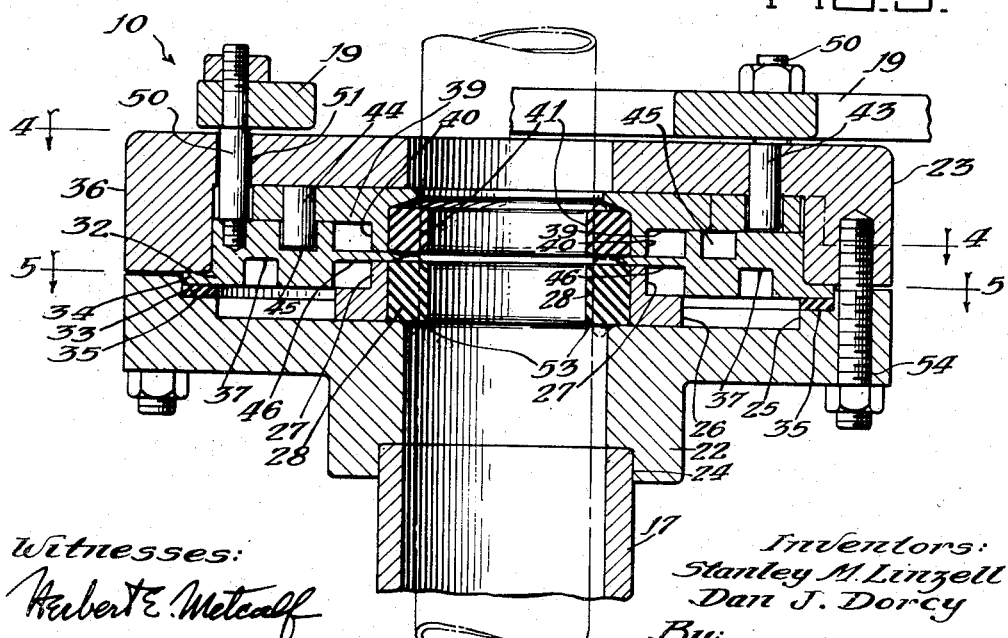
Figure 3 is a sectional view partly in elevation in the planes indicated by lines 3—3 of Figures 4 and 5, looking in the direction of the arrows, showing details of the assembled quick opening and closing device.

Figures 1 and 3 illustrate the ends of elongated sheathed rods and/or cartridges 18 of the type described above extending beyond the quick opening closure device 10. A handle 19 on the closure device 10, Figures 1 and 3, may be rotated 90° from the dotted line to the full line positions, Figure 2, to open the closure device, permitting removal of the cartridge 18 and the insertion of another cartridge with the coolant preferably flowing at a reduced rate within the coolant tube. The length of the handle 19, Figure 2, is such as to permit loading and unloading of contiguous tubes without interference from the handle. Upon insertion of a new cartridge, the handle 19 may be rotated to close and seal the coolant tube against leakage of the coolant along the periphery of the cartridge 18 extending through the closure device.

Figure 4:
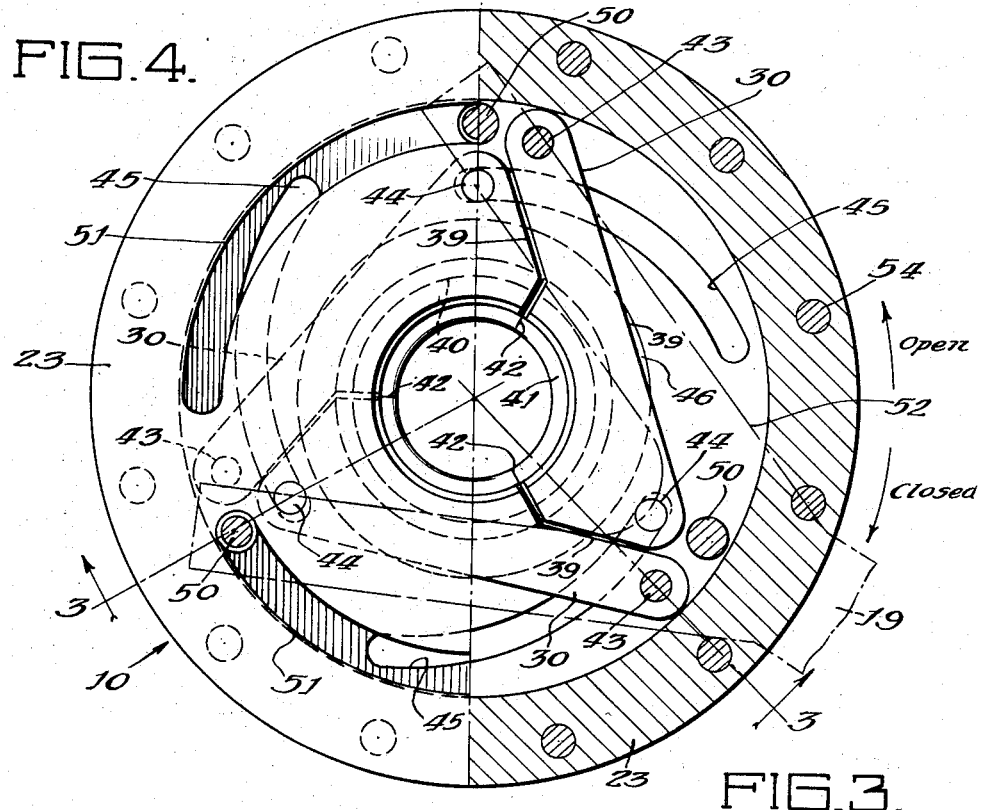
Figure 4 is a sectional view, partially in elevation, in the planes indicated by lines 4—4 of Figure 3, illustrating the front clamping shoes of the closure device and the operating member therefor; and, Figure 5 is a sectional view taken along line 5—5 of Figure 3, looking in the direction of the arrows, illustrating the rear clamping shoes and operating movement thereof.
Figure 5:
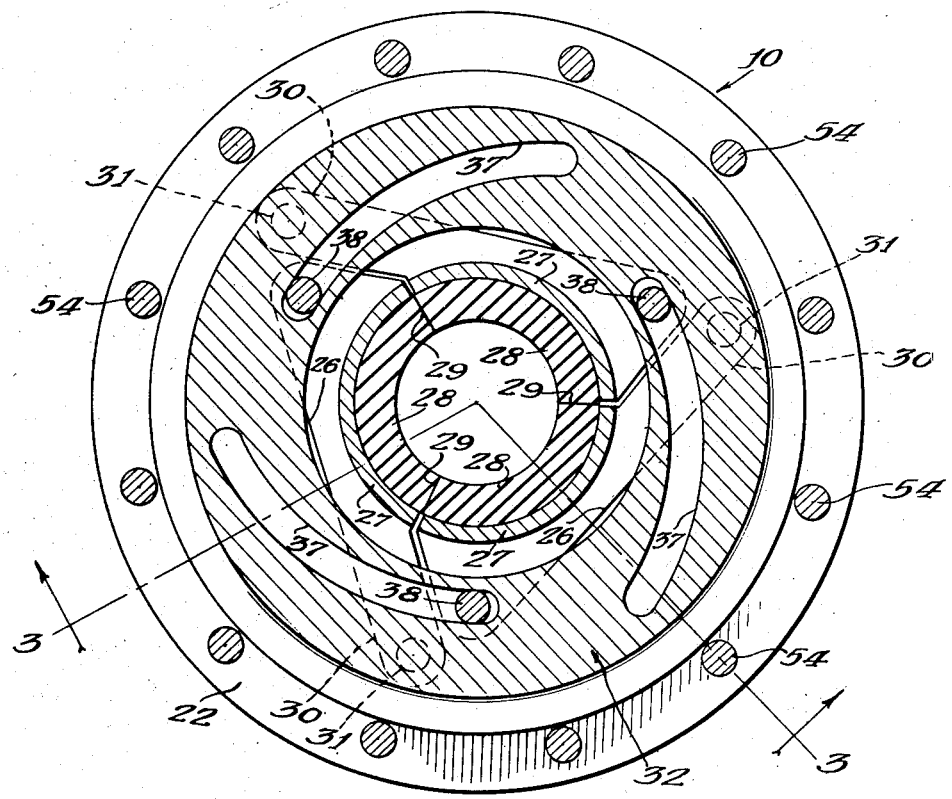

Referring to Figures 3 to 5, inclusive, the particular embodiment of a quick opening stuffing box and/or closure 10 will now be described in detail. The closure device 10 preferably comprises a rear housing 22 and a front housing 23. The rear housing 22, which has an annular recess 24, is affixed to the coolant tube extension 17 by mounting the extension 17 within the recess 24 and securing the parts by welding or other means to form a fluid-tight joint. The rear housing 22 has an axially extending annular portion 25 forming a chamber in which are mounted three rear clamping shoes 26. The rear clamping shoes 26 are formed as illustrated in Figures 3 and 5 and include an axially extending arcuate portion 27 to which neoprene pads 28 are bonded. The neoprene pads 28 and the members 27 to which they are bonded subtend an arc of 120° and the joints 29 between abutting pads are substantially leakproof. Each of the rear clamping shoes 26 has a tangentially extending portion 30 which is pivotally mounted on a pin 31 press-fitted into the rear housing member 22.

An operating ring 32 concentrically mounted with respect to the rear housing 22 is mounted for rotation on a gasket 33. An annular extending flange 34 of the operating ring 32 together with the loose gasket 33 is mounted within a recess 35 formed by the annular portion 25 of the rear housing 22 and an annular axially extending portion 36 of the front housing 23. Cam-shaped slots 37 are provided on the rear face of the operating ring 32 which receive pins 38 affixed to the clamping shoes 26 to move the clamping shoes outwardly to open up the closure device from its closed and/or sealing position. A movement of the operating handle 19 through an angular movement of substantially 90° serves to provide sufficient movement to open the closure. The clamping shoes 26 are so formed that they nest together as illustrated in Figure 5, when in the closed position. As illustrated, an opening is provided for the reception of the cartridge 18, and the neoprene pads 28 provide an efficient seal about the periphery of the cartridge since the diameter of the opening formed by the neoprene pads when not in service is less than the diameter of the cartridge 18.

To provide a more effective seal, three front clamping shoes 39 are provided, Figures 3 and 4. The front clamping shoes 39 are formed of a configuration identical with the rear clamping shoes 26. The front clamping shoes 39 are provided with axially extending arcuate members 40 formed similarly to the members 27 on the rear clamping shoes 26. Neoprene pads 41 are bonded to the members 40, and each of the neoprene pads 41 subtends an arc of 120°. When in the closed position the pads 41 form an opening which is of less diameter than the cartridge 18.

Referring to Figure 3, the neoprene pads 41 are axially thinner than the pads 28 since it is desired to have the innermost seal longer, the outer seal provided by the pads 41 supplementing the inner seal. Joints 42 between the pads 41 are displaced substantially 60° from the joints 29 formed by the pads 28 in the rear seal. The front clamping shoes 39 are pivoted about pins 43 press-fitted into the front housing 23. Pins 44 press-fitted into the clamping shoes 39 extend into cam slots 45, similar to the cam slots 37, for moving the front clamping shoes outwardly and inwardly as the operating ring 32 is rotated from open to closed position. The outward movement of the front clamping shoes is the same as the movement of the rear clamping shoes. In order to space the front and rear clamping shoes and to provide a bearing surface therefor, the operating ring 32 is provided with an inwardly extending annular portion 46, Figure 3.

Rotation of the operating ring 32 is provided through the yoke-shaped handle 19 (Figures 2 and 4). The handle 19 is connected by three stud bolts 50 spaced, as indicated in Figure 4, 120° apart to the operating ring 32, Figure 3.

The studs 50 extend through three slots 51, in the front housing 23, each subtending an arc of 90°, Figures 3 and 4, and the studs 50 have the same movement as the handle 12. Referring to Figure 4, movement of the handle 19 in a counter-clockwise direction serves to open the two banks of clamping shoes. Movement of the handle 12 in a clockwise direction serves to move the banks of clamping members into sealing positions. In Figures 3, 4 and 5, the closure device 10 is in its closed position providing an effective seal for the elongated bar and/or cartridge 18. As indicated at 53 in Figure 3, a tight seal is provided about the periphery of the cartridge 18 to prevent any leakage of coolant fluid from the coolant tube along the surface of the cartridge. A further seal is provided by the gasket 33 positioned between the operating ring 32 and the rear housing member 22. In order to securely affix the front and rear housing members 22 and 23, respectively, suitable securing means in the form of stud bolts 54 and nuts are provided, the stud bolts 54 being in threaded engagement with the front housing member 23. Positive latching means to hold the handle 19 in sealing position may be provided, if desired.

From the foregoing, it is evident that a simple rapidly operable closure providing a leakproof seal has been provided for closing the end of a coolant tube of a reactor, effectively sealing the coolant fluid within the coolant tube against leakage although under pressure. A short movement of 90° effects a quick opening of the clamping shoes for the replacement of a cartridge of fissionable material within the coolant tube and a similar movement in the other direction will effectively seal the cartridge within the coolant tube. The effectiveness of the closure device is such that in replacing a rod the flow of the coolant through the coolant tube need not be stopped but may be slowed to a lesser flow sufficient to carry away the heat.

The apparatus described in the foregoing embodies construction details and a novel mechanical movement providing a simple form of closing device and/or stuffing box suitable for general application. Obviously many modifications may be made in the specific embodiment disclosed without departing from the intended scope of the invention. The features of the invention which are believed to be new are expressly set forth in the accompanying claims.

What is claimed is:

1. A sealing construction comprising a housing adapted to be mounted concentrically with respect to a rod to be sealed and having a concentric slot in an end thereof, a plurality of shoes pivotally mounted in said housing, each of said shoes being provided with a facing portion, a compressible facing on each facing portion, a rotatable member mounted in said housing provided with camming grooves, means connecting said shoes with said camming grooves, and means for quickly rotating said rotatable member in one direction to move said shoes to sealing position and in the opposite direction to move said shoes to open position including a handle having mounting means extending through said slot.

2. A quick opening stuffing box comprising, in combination, a front housing member and a rear housing member connected together forming a chamber, two sets of concentrically mounted sealing members forming a front seal and a rear seal, one set being pivotally connected to the front housing and one set being pivotally connected to the rear housing, both sets being positioned within the chamber formed by the housing members, each sealing member including a compressible facing, a rotatable operating member provided with camming grooves on the front and rear sides thereof, means operatively connecting the sealing members to the camming grooves whereby on rotation of said operating member in one direction the compressible facings are moved to sealing position and upon rotation in the opposite direction are moved to open position, and means for actuating the operating member including a handle member rotatable through an arc of substantially 90°.

3. A sealing device comprising an annular housing having a front portion and a rear portion, said housing having a concentric slot in one portion thereof, two banks of sealing shoes concentrically disposed within the housing, each shoe having an arcuate portion including a compressible facing and a pivoted portion, each arcuate portion being end-to-end to form a circle when in sealing position, one bank having at least two shoes pivoted separately to the front portion, the other bank having at least two shoes pivoted separately to the rear portion, an annular rotatable element between said banks provided with camming grooves on the front and rear sides thereof, a pin on each shoe engaging one camming groove, and means for rotating said element extending through the slot, whereby rotating said means in one direction moves the shoes to sealing position and in the opposite direction moves the shoes to open position.

References Cited in the file of this patent

UNITED STATES PATENTS

| | | |
|---|---|---|
| 334,480 | Sleeper et al. | Jan. 19, 1886 |
| 1,800,694 | Melott | Apr. 14, 1931 |
| 1,849,358 | Standlee | Mar. 15, 1932 |
| 1,999,699 | Koch | Apr. 30, 1935 |
| 2,230,283 | Boggs | Feb. 4, 1941 |